United States Patent [19]

Walter et al.

[11] Patent Number: 4,596,162
[45] Date of Patent: Jun. 24, 1986

[54] PROTECTIVE COVERING FOR STRUCTURAL COMPONENTS OF MACHINE TOOLS

[75] Inventors: Dieter Walter, Seligenstadt; Adam Kern, Offenbach, both of Fed. Rep. of Germany

[73] Assignee: Hema Maschinen- und Apparateschutz GmbH, Seligenstadt, Fed. Rep. of Germany

[21] Appl. No.: 668,076

[22] Filed: Nov. 5, 1984

[30] Foreign Application Priority Data

Nov. 3, 1983 [DE] Fed. Rep. of Germany ... 8331544[U]
Nov. 3, 1983 [DE] Fed. Rep. of Germany ....... 3339769

[51] Int. Cl.⁴ ............................................. F16P 1/00
[52] U.S. Cl. .................................................. 74/608
[58] Field of Search .......................... 74/608, 612, 616

[56] References Cited

U.S. PATENT DOCUMENTS 2,903,840 9/1959 Teupel et al. ..................... 74/608 X
4,114,529 9/1978 Furmaga .......................... 74/608 X

FOREIGN PATENT DOCUMENTS 7809596 8/1978 Fed. Rep. of Germany .
7904162 5/1979 Fed. Rep. of Germany .

Primary Examiner—Alan Cohan
Assistant Examiner—John A. Rivell
Attorney, Agent, or Firm—Michael J. Striker

[57] ABSTRACT

A protective covering for structural components of machine tools includes a U-shaped foldable support and a cover applied to the upper surface of the support and formed of a plurality of metal sheets partially overlapping each other. A plurality of tape-shaped connecting elements are interconnected between the longitudinal edges of the sheets of the cover and the associated walls of the folds of the support. Each connecting member includes a slack intermediate portion which permits a movement of the connecting edges of the cover sheets in the direction normal to the direction of the movement of the support during its folding.

16 Claims, 2 Drawing Figures

PROTECTIVE COVERING FOR STRUCTURAL COMPONENTS OF MACHINE TOOLS

BACKGROUND OF THE INVENTION

The present invention relates to protective coverings which are utilized for covering structural components or units of the machines, for example cutting machine tools so as to protect people passing thereby against injuries by metal components.

The structural elements covered with protective coverings are also protected against harmful effects and the personnel is protected against possible dangerous contact with those structural elements and units of the machine. These protective coverings can be employed, for example, with the machine tools for forming workpieces by cutting, for covering, for example such structural elements as slide or guide tracks, or shafts, or spindles. These protective coverings may be, for example foldable bellows or aprons. The length of such coverings is variable, so that a covering connecting two spaced machine parts, displaceable relative to each other, covers the space between these parts as well as structural elements, as slide or guide tracks, within that space. These protective coverings are foldable and expandable like harmonika. The protective coverings, which, for example are applied to cutting machine tools or processing centers, can be exposed to actions and attacks by hot metal chips as well as to attacks by cooling and lubrication agents. In these instances the protective coverings are provided, in the region of the direct attacks of the above agents, with covers made of metal laminations resp. lamellae or sheets overlapping each other in a squamous fashion.

The present invention relates more particularly to a protective covering for structural components of the machines, which includes a foldable support and a cover provided on the outer side of the support and comprised of a plurality of laminations overlapping each other in a squamous fashion.

For connecting the individual laminations of the cover with the foldable support there are many possibilities.

In the protective covering disclosed in DE-Gbm No. 7,809,596 and including a cover and a foldable support formed of foldable bellows the individual laminations or sheets of said cover have an angular profile. Each individual sheet of the cover is rigidly secured immediately to the angular arm on the fold wall of the support, for example by gluing to the fold support. This fastening of the angle-shaped laminations has the disadvantage that, upon the folding of the folds of the support of the protective cover to a folded position the laminations can raise so that the cover can expand. Thereby interstices between individual laminations will occur so that the screening of the upper surface of the foldable bellows will be no longer ensured. The closest possible arrangement of the individual folds of the support with one another is substantially determined and limited by the thickness of the laminations in the region of glue connections between the laminations and the fold walls of the support. Moreover, in many machine tools the space given for installing the protective covering is limited so that there is a requirement that the protective covering having a predetermined maximal length of extension would be able to be pressed to a possible smallest overall dimension, so-called block dimension. In the protective covering pressed to a so-called block dimension, the folds of the carrier or support lie closely adjacent to each other. With special inserts, where the protective covering is exposed to special lubricating and cooling agents it has been however, observed that adhesive connections in the protective coverings had no sufficient service life and durability. The adhesive connections made with usual adhesives or glues employed for securing the laminations to the foldable support have not been universal and could not be applied in each case.

Another known protective covering, disclosed in DE-Gbm No. 7,904,162 includes a cover and a foldable bellows as carrier of the lamellae or sheets of the cover. At every second upper fold peak of the bellows projects a connection member, so-called welt which extends over the lengths of the fold peaks and is secured thereto. This welt includes a web portion and a thicker head portion. The web portion, is inserted into a portion in the fold peak. The head portion of the connection member extends parallel to the edge of the fold peak. To connect a sheet or lamination to a connection member the head portion of this member is inserted into a clamp-shaped connecting portion on the longitudinal side of the lamination, for example from the side thereof, and is clamped in the end portion of the lamination. The clamp-shaped end portion of each lamination is arranged on the bent or arm-like portion thereof. With this releasable connection with the aid of the connection members the above noted difficulties, occuring when adhesives are employed, are avoided. The mounting of the connection member or so-called welt and the forming of the clamp-shaped end portions of the laminations for receiving the head portion of the connection member are, however rather complex. Furthermore with such construction of the protective covering, practically no movability is given to the laminations relative to the support. It is also difficult to position the folds of the support and, respectively the laminations, closely adjacent to each other or to obtain a required block-or-overall dimension. The possible smallest block dimension provides the possible smallest space consumption in the folded position of the protective covering with a predetermined maximal length of expansion. Inasmuch as the space available for protective coverings for compact machine tools is always small the small block dimension with the maximal length of expansion of the covering becomes an important criteria.

SUMMARY OF THE INVENTION

It is an object of the present invention to provide an improved protective covering for structural components of machine tools.

It is another object of the invention to provide a protective covering formed of a foldable support and a cover of overlapping laminations, which would ensure a smallest possible block dimension of the covering in the foldable position and would provide an effective and reliable screening of the machine elements against exposure in any extended position of the protective covering.

These and other objects of this invention are attained by a protective covering for covering structural components of machines, comprising a foldable support having an outer side and fold walls; a cover positioned on the outer side of said support and including a plurality of sheets overlapping each other in a squamous fashion, said sheets having substantially straight-line connecting edges; and connection means connecting said connecting edges of the sheets to said foldable support, each connection means includes at least one connecting tape, each tape having a first end portion connected to the associated sheet, second end portion connected to the associated fold wall of the support, and a slackened intermediate portion extended between the first end portion and the second end portion said intermediate portion being so dimensioned that, upon folding of the support to a folded position, said connecting edges facing the associated tapes can perform a movement in the direction perpendicular to the direction of movement of the support during its folding.

The construction of the protective covering of the present invention provides for a universal movable arrangement of the individual sheets or laminations relative to the support. The slackened intermediate portion of the tape is dimensioned in its length and flexibility such that the overlapping outer or upper sheets lie on the respective lower sheets at least partially under the influence of gravity force. Since the sheets connected to the support by the slackened intermediate portions of the tapes can take in the direction of the movement of the support practically only a pulling force it is possible to bring the folds of the support closely adjacent to each other. The smallest distance between the adjacent folds corresponds to the thickness of the support-side end portion of the tape. The cover sheets and the tapes present no hindrance to the folding or expansion of the protective covering. The inner sheets of the cover can easily move under the adjacent outer sheets of the cover. The outer sheets can be lifted in the region of their connecting edges and thereby can form, below the connected slack intermediate portions of the connecting tapes, air spaces, in which the portions of the inner sheets of the cover can be received. The sheets of the cover, suspended on the end of the support by the connecting tapes remain under the influence of the gravity force at least at the free ends thereof. The danger that the free ends of individual sheets or laminations would extend out from the cover during the forcing of the covering to its folded position and also upon reaching its end position is avoided. A further advantage of the proposed protective covering resides in that the sheets of the cover are very simple in construction and can be preferably rectangular plates. The protective covering of this invention is suitable for a vertical application and for a horizontal application onto the machine tool as well. In other words, the protective covering is suitable for the constructions with the vertical and horizontal orientation of the structural components to be covered.

Each connecting tape may be a textile fabric tape which may be made of polyester. Thereby a flexible tape-shape connection member is provided, which has a sufficient strength with a relatively small thickness.

The thickness of each connecting tape may be smaller than the thickness of each sheet of the cover. Therefore practically unobjectionable, very close arrangement of the adjacent folds or fold walls of the support may be attained.

The width of each tape may correspond to the length of the connecting edge of each sheet. This embodiment has the advantage that during the manufacture of the protective covering the binding of a sheet of the cover to a fold wall of the support by means of one tape extended over the entire length of the connecting edges can be performed faster than the binding of a sheet by means of a plurality of smaller tapes arranged at intervals from each other. This results in a saving of production costs which usually will be not compensated by the costs due to the increased consumption of tape material when using such a tape as connection member.

The first end portion of each tape may be connected to the associated sheet by rivets whereas the second end portion may be connected to the associated fold wall by at least one close seam. Thereby a reliable adhesive-free connection between the tape-shaped connecting member and the respective sheet of the cover or the respective fold wall is provided. It is also provided that the end portions of the tape are secured, respectively, to the fold walls and the cover sheets in a smooth and flat fashion. Thus, a reliable connection between the tape and the respective cover sheet, as well as the respective fold wall, is ensured by rivets or by a thread seam resp. sewing thread and not by adhesives.

Of course, adhesives can be also employed for connecting either the first end portion or the second end portion of each tape to the respective surfaces of the cover sheet or the fold wall.

Each individual sheet of the cover may correspond to each fold of the support. Therefore the cover sheets of substantially smaller width can be employed. This also results in a smaller block dimension. The width of the sheets of the cover must correspond somewhat to the length of extension of one and a half folds with the maximal expansion of the protective covering.

The cover sheets may be formed of metal tape material of small thickness and may be therefore easily manufactured with insignificant costs and at the same time ensure a high protective effect, The cover sheets may be strip-like or rectangular.

Each cover sheet may be slightly curved in cross-section whereby its stability is increased so that, upon the displacement of the cover sheets relative to each other an enclosed screening of the covered surface of the foldable support by the entire cover is ensured.

The uppermost sheet of the cover sheets may be loaded by resilient pressing means and pressed with its free portion against the adjacent inner sheet by the force exerted from the pressing means. The pressing means is rigidly secured with its one end portion to the end portion of foldable support being adjacent to the uppermost sheet. Thus, a reliable contact between adjacent cover sheets is ensured by said pressing means.

The pressing means may have a roof shape or an angular profile extending over the entire length of the connecting edge of the uppermost sheet, so that a screeening of the rear portion of uppermost sheet and of the appertaining connecting tape is given. Therefore all of the connecting tapes and all the connections between tape and sheets as well as between tapes and foldable support may be protected against harmful external effects.

The pressing means may be made of metal tape material of small thickness. Thus, an enclosed screening of the covered surface of the foldable support is attained by metal parts having a comparatively light weight.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
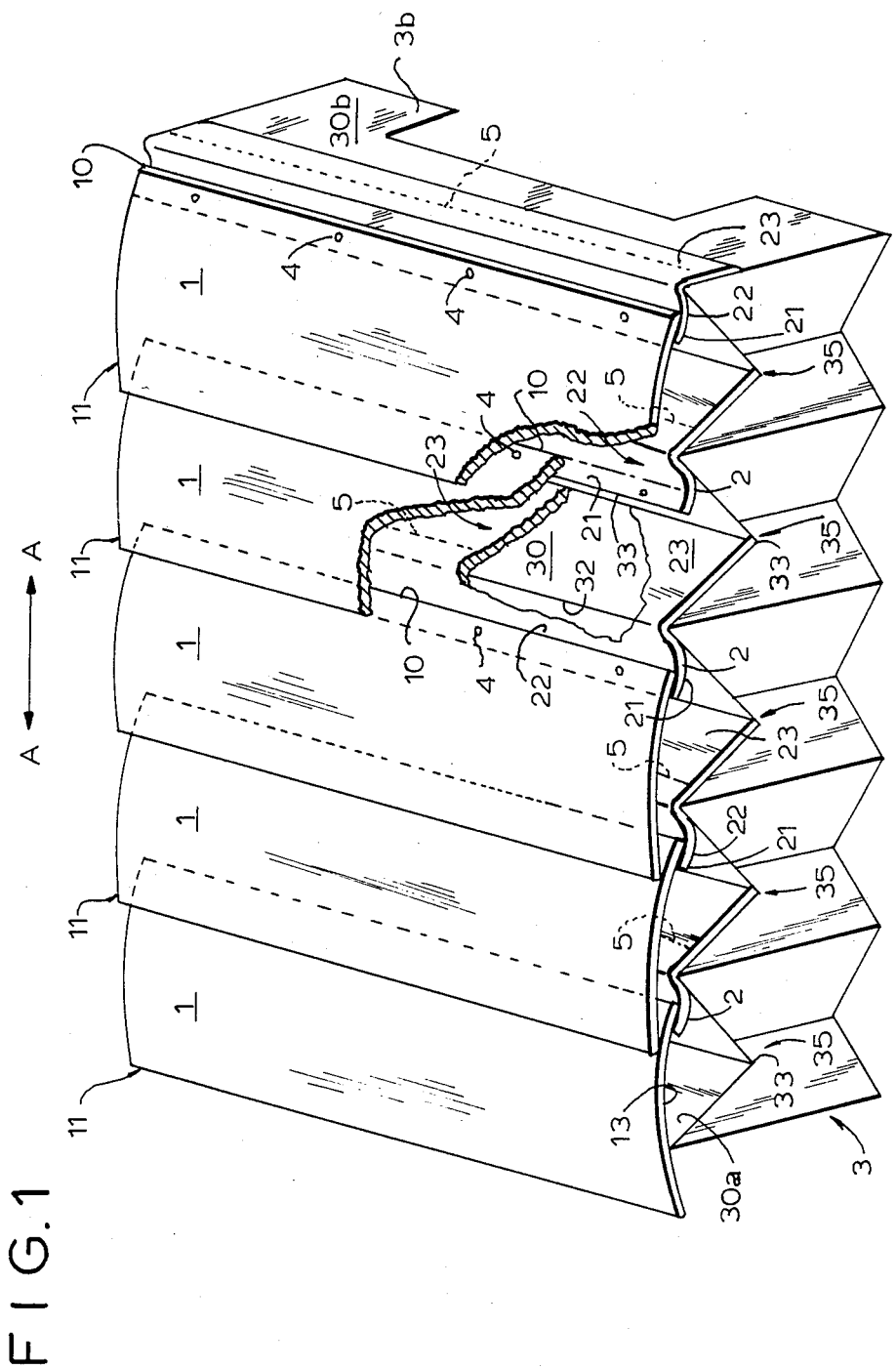
FIG. 1 illustrates a perspective view of a first embodiment of the protective covering of the present invention.
Figure 2:
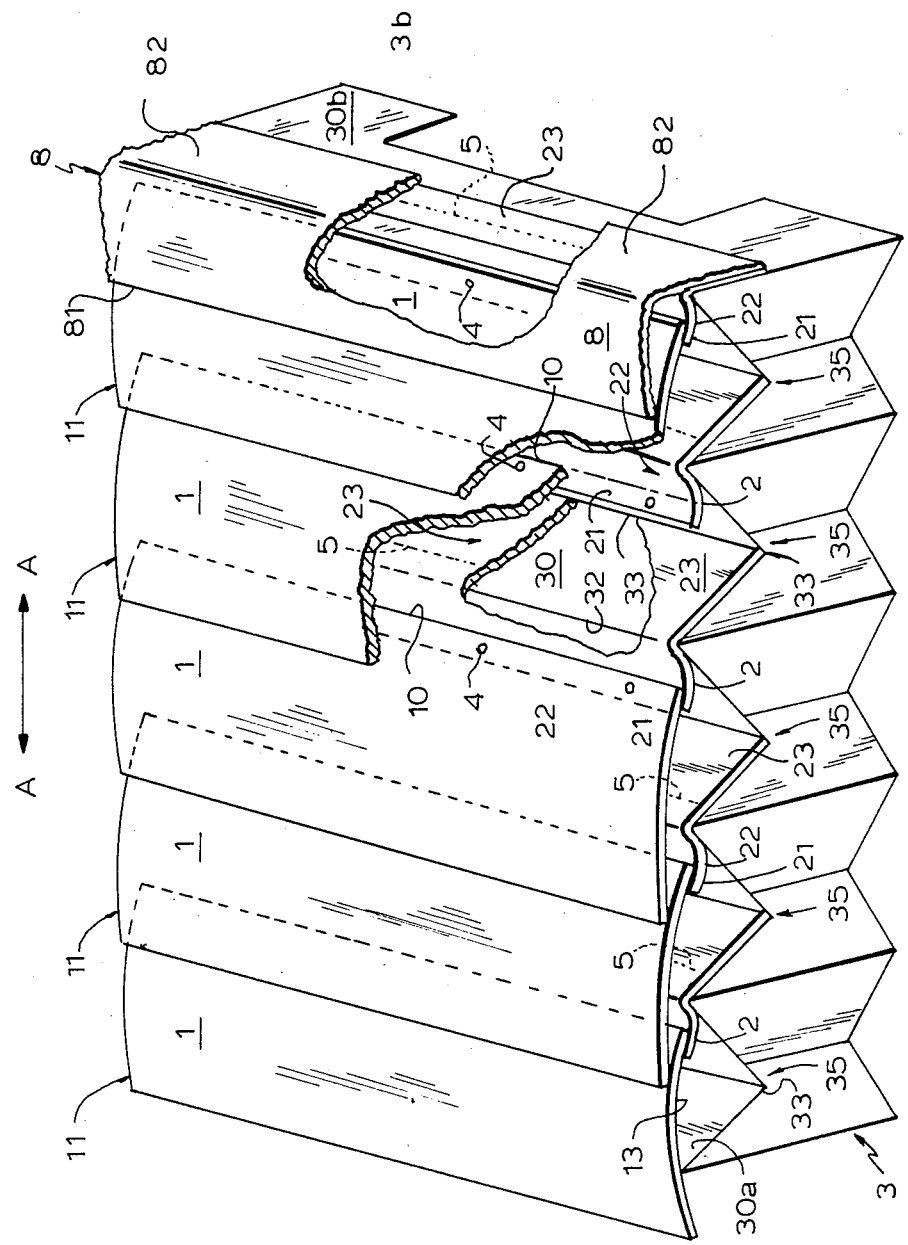
FIG. 2 illustrates a perspective view of a second embodiment of the protective covering of the present invention.

Referring to the FIGS. 1 and 2 in greater detail it will be seen that the protective covering for covering structural units of, for example cutting machine tools,is a substantially U-shaped foldable bellow-type covering which carries at the upper wall thereof a cover made of laminations. This cover in the region of the second lamination from the right-hand side of the drawing is broken-away. The protective covering of this type can be employed for covering slide and guide tracks of the cutting machine tools.

The U-shaped bellow-type covering includes a foldable carrier or support 3 which serves as a support for the sheet-like cover formed of a plurality of sheets or laminations 1 overlapping each other in a squamous fashion. Carrier 3 together with the cover formed of sheets 1 is foldable resp. telescopical or expandable in the moving direction indicated by arrows A—A. The laminated cover covers the upper wall of the carrier 3 and is laid substantially parallel to the plane formed by upper fold peaks 32.

The laminated cover is formed of a number of sheets 1. Five sheets or laminations are shown in the exemplified embodiment. Sheets 1 are substantially strip-shaped or rectangular and are made of a metal tape of small thickness, for example a tape of stainless steel of the thickness from 0.0001 to 0.0002 m. Sheets 1, which are here seen in cross-section, are insignificantly curved outwardly or in other-words, they are formed as slightly-curved archs 13. Sheets 1 extend transversally of the direction of the movement A—A of the covering and parallel to each other. Sheets or laminations 1 overlap each other in the squamous manner in the folded condition and also in the expanded condition as shown in the drawing.

In order to fasten each sheet 1 to carrier or support 3 tapes 2 are provided, which act as connecting means. Each tape may be made of textile fabric tape of polyester material. The width of the tape 2 corresponds to the length of the longitudinal side or connection edge 10 of the covering sheet 1, so that tape 2 extends over the entire length of sheet 1. The thickness of each tape 2 is here smaller than that of sheets 1.

The tape-shaped connection member has three portions shown in the drawings in the broken-away region. The first support-side end portion 23 of tape 2 is connected to the fold wall 30 of support 3. The fold walls 30 are normally limited by their upper peaks 32 and lower peaks 33. At the right-hand end of the protective covering it is seen that end portion 23 of the tape 2 is directly supported on the fold wall 30b. At the end of the covering the fold wall 30b corresponds to the end portion of support 3. The support-side end portions 23 of tape 2 are secured to the fold walls 30 by thread or weld seam 5. The sheet-side end portion 21 of tape 2 is secured to the sheets 1 made of a steel strip by rivets 4. Additionally to a mechanical fastening by rivets 4 or threads 5 the end portions 21, 23 of the connecting tape 2 may be secured with their surfaces to sheets 1 or to fold walls 30, respectively, by adhesive. Due to the provision of surface-type fastening of the tape to the sheets and support walls a better aesthetic appearance of the protective covering is obtained and in a certain degree a support for the rivet or weld connection between walls 30. Each end portion 21, 23 of the tape 2 extends from and is connected to an intermediate portion 22 which is slack and is practically loadable only upon pulling of the covering. Intermediate portion 22 extends from the upper fold peak 32 to the longitudinal side or connection edge 10 of sheet 1. The distance between the fold peak and the connection edge is in the example shown about 0.005 m and is so selected that the outer sheet of the adjacent overlapping sheet 1 lies on the free end portion 11 of the inner sheet under the influence of gravity force.

The last fold 35 as seen at the left-hand side of the drawing, will be the lowermost fold of support 3 with the vertical arrangement of the protective cover . It is advantageous when the sheet lying over the fold wall 30a of the last fold 35 or the lowermost sheet of the covering is arranged in such a manner that this last sheet would be curved not upwardly but rather downwardly. Thereby such downwardly-curved last sheet, upon folding of the protective covering, would form a gutter-shaped guide for the sheets sliding thereonto. The last or lowermost sheet can coincide in shape with the remaining sheets of the covering but can be formed with the downward curve relative to support 3.

The embodiment of FIG. 2 is similar to the preceding embodiment of FIG. 1. However, in contrary to the first embodiment the second embodiment is provided with a pressing means 8. This pressing means 8, as seen at the right-hand side of FIG. 2 in the region of its middle portion is broken-away. The means has a roof shape resp. an angular profile extending over the entire length of the connecting edge 11 of the uppermost sheet 1. The uppermost sheet 1 is the first cover sheet, as seen at the right-hand side of FIG. 2. The means 8 is made of metal tape material of small thickness and it is rigidly secured, for example by means of rivets 83, with its end portion 82 to the end portion 3b resp. fold wall 30b of the foldable support 3. The other end portion 81 of the resilient means 8 is contacting and loading the uppermost cover sheet 1. This cover sheet 1 is pressed by the resilient means 8 against the adjacent inner cover sheet 1 being partly overlapped by the end portion 81. The force exerted on that inner sheet 1 will be transmitted to the following cover sheets 1. Thus an enclosed metal-cover for the upper wall of the foldable support 3 by displaceable sheets 1 is ensured. Each of the connecting tapes 2 of the protective covering is covered and protected.

It will be understood that each of the elements described above, or two or more together, may also find a useful application in other types of protective coverings for machine structural components differing from the types described above.

While the invention has been illustrated and described as embodied in a protective covering for machine structural components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A protective covering for covering structural components of machines comprising a foldable support having an outer side and fold walls; a cover positioned on the outer side of said support and including a plurality of sheets overlapping each other in a squamous fashion, said sheets having substantially straight-line connecting edges; and connection means connecting said connecting edges of the sheets to said foldable support, each connection means includes at least one connecting tape, each tape having a first end portion connected to the associated sheet, a second end portion connected to the associated fold wall of the support, and a slackened intermediate portion extended between the first end portion and the second end portion, said intermediate portion being so dimensioned that, upon folding of the support to a folded position, said connecting edges facing the associated tapes can perform a movement in the direction perpendicular to the direction of the movement of the support during its folding.

2. The protective covering as defined in claim 1, wherein each tape is a textile fabric tape.

3. The protective covering as defined in claim 2, wherein said textile fabric is of polyester.

4. The protective covering as defined in claim 1, wherein the thickness of each tape is smaller than the thickness of each sheet.

5. The protective covering as defined in claim 1, wherein the width of each tape corresponds to the length of the connecting edge of each sheet.

6. The protective covering as defined in claim 1, wherein said first end portion of each tape is connected to the associated sheet by rivets.

7. The protective covering as defined in claim 6, wherein said second end portion is connected to the associated fold wall by at least one close seam.

8. The protective covering as defined in claim 1, wherein said first end portion is connected to the associated sheet by adhesives by gluing contacting surfaces of said end portion and said sheet to each other.

9. The protective covering as defined in claim 1, wherein said second end portion is connected to the associated fold wall by adhesives by gluing contacting surfaces of said end portion and said sheet to each other.

10. The protective covering as defined in claim 8, wherein said second end portion is connected to the associated fold wall by adhesives by gluing contacting surfaces of said end portion and said sheet to each other.

11. The protective covering as defined in claim 1, wherein each sheet of the cover corresponds to each fold of the support.

12. The protective covering as defined in claim 1, wherein said sheets are formed of metal tape material of small thickness.

13. The protective covering as defined in claim 1, wherein each sheet is slightly curved in cross-section.

14. The protective covering as defined in claim 1, wherein the uppermost sheet of said cover of sheets is pressed against the adjacent inner sheet by resilient pressing means being secured to the end portion of said foldable support being adjacent to the uppermost sheet.

15. The protective covering as defined in claim 14, wherein said pressing means being roof-shaped covers the rear portion of the uppermost sheet with connecting edge and the appertaining connecting tape.

16. The protective covering as defined in claim 15, wherein said pressing means is formed of metal tape material of small thickness.

* * * * *